(12) United States Patent
Aoki

(10) Patent No.: US 6,822,681 B1
(45) Date of Patent: Nov. 23, 2004

(54) IMAGE CAPTURING DEVICE FOR CAPTURING A SHAPE OF A MEASUREMENT SUBJECT

(75) Inventor: Harumi Aoki, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/343,392

(22) Filed: Jun. 30, 1999

(30) Foreign Application Priority Data

Jul. 2, 1998 (JP) ......................................... P10-187213

(51) Int. Cl.$^7$ ........................... H04N 5/335; G01C 3/08
(52) U.S. Cl. ....................... 348/296; 348/295; 356/5.01
(58) Field of Search ................................ 348/295, 296; 356/5.01, 5.02, 5.03, 5.04, 5.07, 5.08, 5.09

(56) References Cited

U.S. PATENT DOCUMENTS

| | | | |
|---|---|---|---|
| 4,497,065 A | * | 1/1985 | Tisdale et al. ............... 382/103 |
| 4,686,572 A | | 8/1987 | Takatsu |
| 4,915,498 A | * | 4/1990 | Malek ........................ 356/5.04 |
| 5,081,530 A | | 1/1992 | Medina |
| 5,115,269 A | * | 5/1992 | Masanaga et al. .......... 396/106 |
| 5,179,286 A | * | 1/1993 | Akasu ................... 250/559.38 |
| 5,191,435 A | * | 3/1993 | Tsunekawa et al. ......... 386/117 |
| 5,682,201 A | * | 10/1997 | Ogawa .................... 348/224.1 |
| 5,739,901 A | * | 4/1998 | Fujioka et al. ............. 356/5.01 |
| 5,828,443 A | * | 10/1998 | Fujioka et al. ............. 356/5.08 |
| 5,892,576 A | * | 4/1999 | Gaechter .................... 356/5.05 |
| 6,021,210 A | * | 2/2000 | Camus et al. ............... 382/117 |
| 6,057,909 A | * | 5/2000 | Yahav et al. ............... 356/5.04 |
| 6,108,071 A | * | 8/2000 | Landry et al. .............. 356/5.05 |
| 6,373,557 B1 | * | 4/2002 | Mengel et al. ............. 356/4.07 |
| 6,429,898 B1 | * | 8/2002 | Shoda et al. ................. 348/316 |
| 6,429,941 B1 | * | 8/2002 | Kamon et al. .............. 356/614 |
| 6,437,853 B2 | * | 8/2002 | Seo ............................ 356/5.01 |
| 6,456,368 B2 | * | 9/2002 | Seo ............................ 356/5.01 |

FOREIGN PATENT DOCUMENTS

| | | |
|---|---|---|
| JP | 4351074 | 12/1992 |
| JP | 7-6781 | 1/1995 |
| JP | 7110381 | 4/1995 |
| WO | 97/01111 | 1/1997 |

OTHER PUBLICATIONS

Design and Development of a Multi–Detecting Two–Dimensional Ranging Sensor, by Christie et al., Meas. Sci. Technol. 6 (1995) pp. 1301–1308.

* cited by examiner

Primary Examiner—Andrew Christensen
Assistant Examiner—Phan Tran
(74) Attorney, Agent, or Firm—Greenblum & Bernstein, P.L.C.

(57) ABSTRACT

A three-dimensional image capturing device comprises a light source and an imaging device, such as a CCD, having a plurality of photo-diodes. The light source outputs a pulsed distance measuring light beam simultaneously with a discharge of unwanted charges from the photo-diodes due to an electric charge discharging signal. A reflected light beam, generated by a measurement subject due to the distance measuring light beam, is received by the photo-diodes. When a predetermined time has elapsed since the output of the distance measuring light beam, an electric charge transfer signal is output so that electric charge, i.e. signal charge accumulated in each of the photo-diodes, is transferred to the vertical transfer unit. The electric charge and the electric charge discharging signal are repeatedly output, so that the signal charge is integrated in the vertical transfer unit. Numbers of the electric discharging signals and the electric charge transfer signals are adjusted such that a level of the signal charge has a proper value.

14 Claims, 15 Drawing Sheets

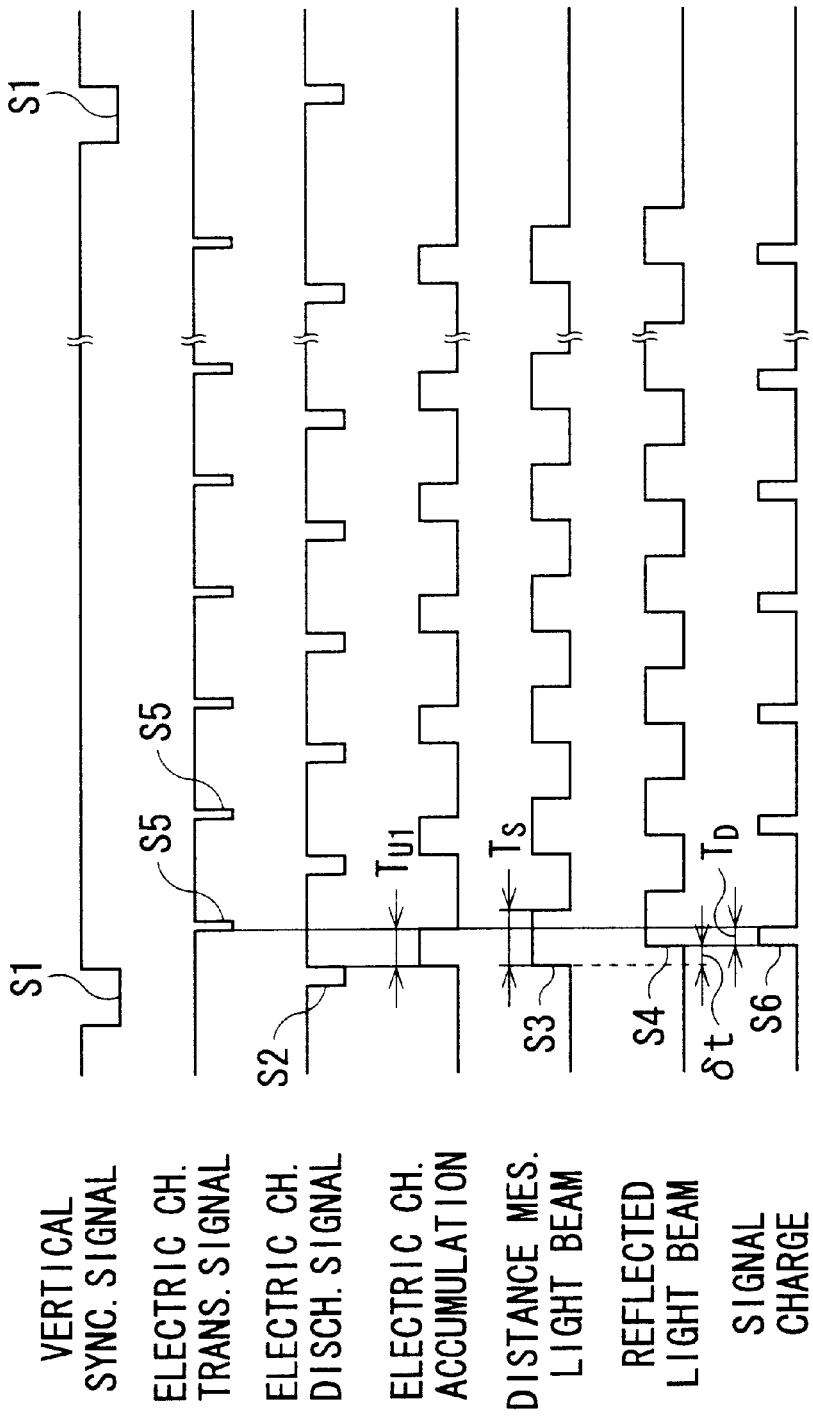

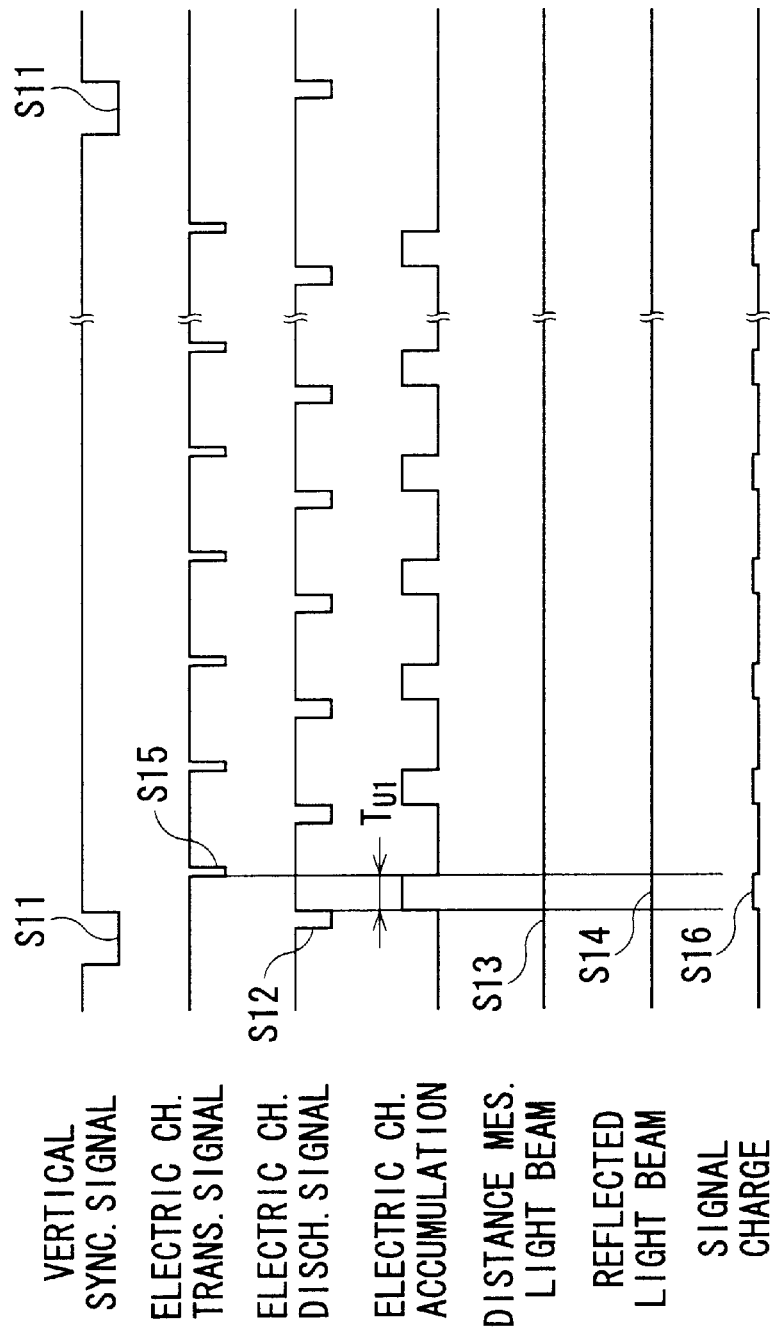

IMAGE CAPTURING DEVICE FOR CAPTURING A SHAPE OF A MEASUREMENT SUBJECT

BACKGROUND OF THE INVENTION

1. Field of the Invention

The present invention relates to a three-dimensional image capturing device by which a three-dimensional shape of a measurement subject, which is to be measured, can be captured by a time-of-flight measurement.

2. Description of the Related Art

A three-dimensional measurement using a three-dimensional image capturing device is classified as an active system, in which light, an electric wave or sound is radiated onto a measurement subject, and a passive system in which the light, electric wave or sound is not output. The active system comprises the time-of-flight measurement, a phase detection using a modulated light wave, a triangulation, a moiré topography, and so on, and the passive system comprises a stereo vision system, and so on.

An active system device is bulky in comparison with that of the passive system, since the device requires a laser beam output mechanism. However, the active system device is superior regarding a distance measurement resolution, a measuring time, a measuring range and so on, and thus, despite the bulkiness, the device is utilized in various fields. In a three-dimensional image capturing device, described in "Measurement Science and Technology" (S. Christies et al., vol.6, p.1301–1308, 1995), a pulse-modulated laser beam irradiates a measurement subject, and a reflected light beam, which is reflected by the measurement subject, is received by a two-dimensional CCD sensor to which an image intensifier is attached, so that an image signal, corresponding to the reflected light beam, is converted to an electric signal. ON-OFF control of the image intensifier is carried out by a gate pulse, which is synchronized with the pulse radiation of the laser beam. According to the device, since an amount of received light, based on the reflected light beam from the measurement subject, which is positioned far from the device, is less than that of received light based on a reflected light beam from a measurement subject, which is close to the measurement subject, an output corresponding to a distance between the measurement subject and the device can be obtained for each pixel of the CCD.

In a device disclosed in International Publication No. 97/01111, light, such as a laser beam, which is pulse-modulated, irradiates a measurement subject, and a reflected light beam, which is reflected by the measurement subject, is received by a two-dimensional CCD sensor which is assembled with a mechanical shutter or an electro-optical shutter formed by a liquid crystal display, so that an image signal corresponding to the reflected light beam is converted to an electric signal. The shutter is controlled at a timing which is different from that of the laser beam, so that distance information of the measurement subject is obtained for each pixel of the CCD.

In the conventional three-dimensional image capturing device of an active system described above, an optical shutter, such as a KDP element, is provided so that an electric charge accumulating operation in the CCD sensor is controlled. However, not only is the optical shutter bulky, but also an electric circuit, which outputs a high voltage to drive the optical shutter, should be provided, and thus the conventional device becomes and remains bulky.

On the other hand, in U.S. Pat. No. 5,081,530, a device, in which an electronic shutter is provided for controlling an electric charge accumulating operation of a CCD sensor, is disclosed. However, an output of the CCD sensor, which is obtained by a single operation of the electronic shutter, is not great enough to sense distance information of the measurement subject.

SUMMARY OF THE INVENTION

Therefore, an object of the present invention is to provide a miniaturized three-dimensional image capturing device, which operates without an optical shutter, and by which an output sufficient to acquire three-dimensional distance information of the measurement subject is obtainable.

According to the present invention, there is provided a three-dimensional image capturing device comprising a light source, a plurality of photoelectric conversion elements, a signal charge holding unit, an electric charge discharging processor, a signal charge transfer processor, a signal charge integrating processor and a signal level adjusting processor.

The light source radiates a distance measuring light beam irradiating a measurement subject, which reflects the distance measuring light beam to generate a reflected light beam. The plurality of photoelectric conversion elements receive the reflected light beam, so that electric charge corresponding to an amount of the received reflected light beam is accumulated in each of the photoelectric conversion elements. The signal charge holding unit is disposed adjacent to each of the photoelectric conversion elements. The electric charge discharging processor discharges unwanted charge accumulated in each of the photoelectric conversion elements, so that an accumulating operation of signal charge is started in each of the photoelectric conversion elements. The signal charge transfer processor transfers the signal charge accumulated in the photoelectric conversion elements to the signal charge holding unit. The signal charge integrating processor outputs control pulse signals to drive the electric charge discharging processor and the signal charge transfer processor alternately, in accordance with a number of the control pulse signals, for a predetermined period, so that the signal charge is integrated in the signal charge holding unit. The signal level adjusting processor controls the number of the control pulse signals to adjust a level of the signal charge.

Further, according to the present invention, there is provided a three-dimensional image capturing device comprising the light source, the plurality of photoelectric conversion elements, the signal charge holding unit, the electric charge discharging processor, the signal charge transfer processor, a signal charge integrating processor and a signal level adjusting processor.

The signal charge integrating processor drives the electric charge discharging processor and the signal charge transfer processor alternately, so that the signal charge is integrated in the signal charge holding unit. The signal level adjusting processor controls the number of operations by which the signal charge integrating processor drives the electric charge discharging processor and the signal charge transfer processor alternately, so that a level of the signal charge is adjusted.

BRIEF DESCRIPTION OF THE DRAWINGS

The objects and advantages of the present invention will be better understood from the following description, with reference to the accompanying drawings in which:

FIG. 7 is timing chart of a distance information sensing operation by which data, corresponding to a distance from a camera body to each point on a surface of the measurement subject, is sensed;

FIG. 9 is a timing chart showing a distance correction information sensing operation;

DESCRIPTION OF THE PREFERRED EMBODIMENTS

Figure 1:
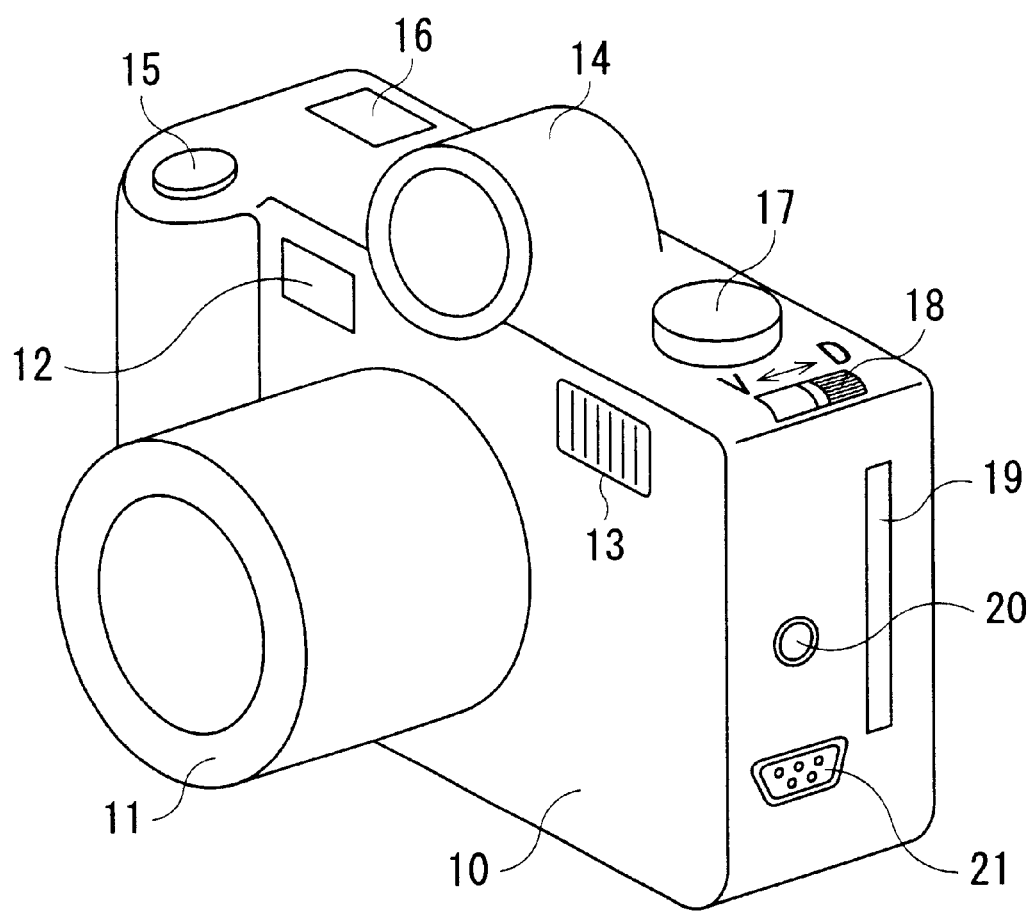
FIG. 1 is a perspective view showing a camera provided with a three-dimensional image capturing device of an embodiment of the present invention.

The present invention will be described below with reference to the embodiment show in the drawings.

FIG. 1 is a perspective view of the camera with a three-dimensional image capturing device of a first embodiment of the present invention.

On a front surface of a camera body 10, a viewfinder window 12 is provided toward a left-upper corner, adjacent to a photographing lens 11, and electronic flash 13 is disposed toward a right-upper corner. On an upper surface of the camera body 10, a light emitting device (i.e., a light source) 14, which radiates a laser beam (an infrared laser beam, for example, being a distance measuring light beam) is mounted above the photographing lens 11. A release switch 15 and a liquid crystal display panel 16 are provide on a left side of the light emitting device 14, and a mode change dial 17 and V/D mode switch 18 are provided on a right side of the device 14. On a side surface of the camera body 10, a card slot 19 is formed into which a recording medium (not shown), such as an IC memory card, is insertable, and a video output terminal 20 and an interface connector 21 are also provided.

Figure 2:
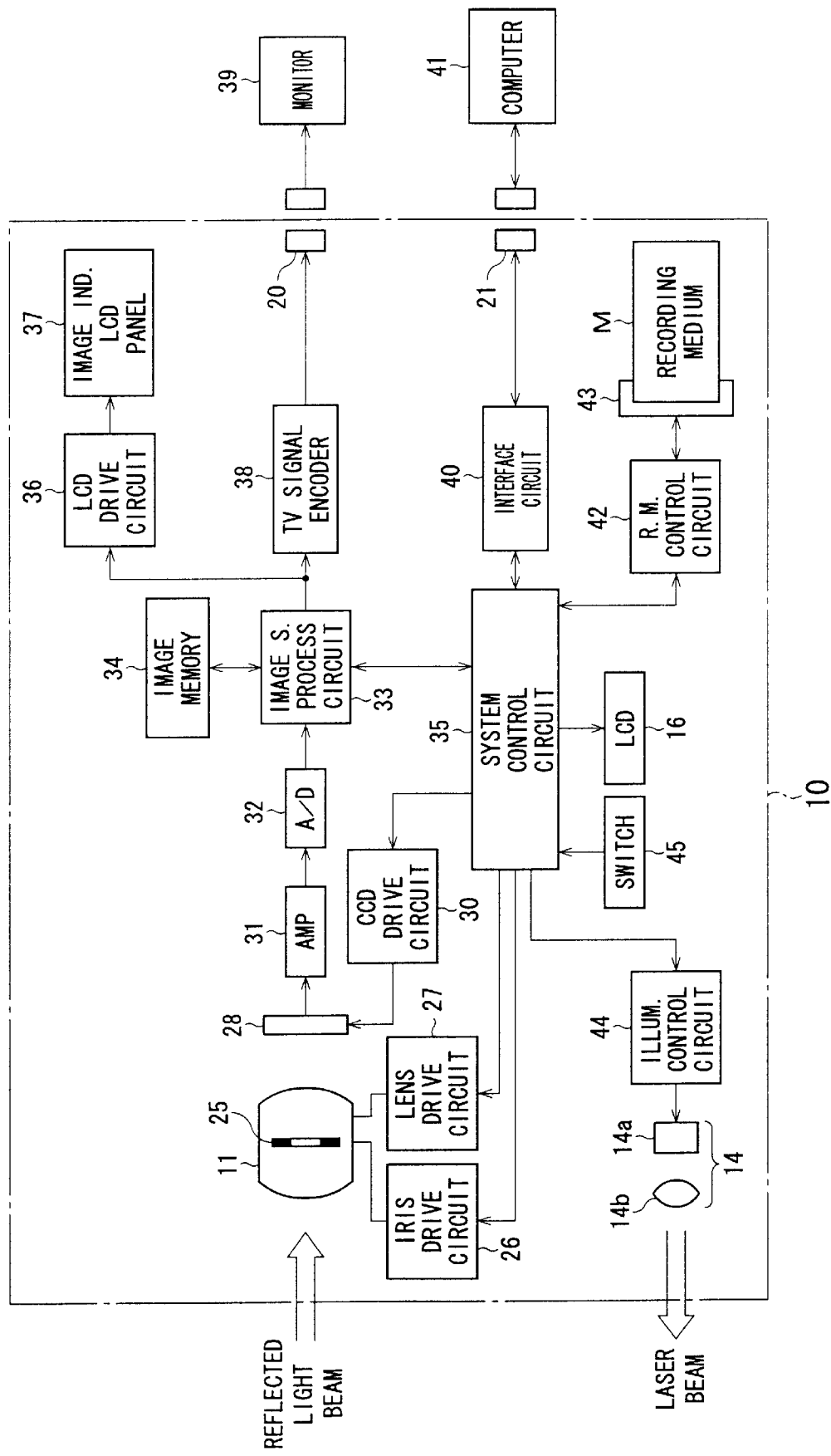
FIG. 2 is a block diagram showing an electrical construction of the camera shown in FIG. 1.

FIG. 2 is a block diagram showing an electrical construction of the camera of FIG. 1.

An aperture 25 is provided in the photographing lens 11. The opening degree of the aperture 25 is adjusted by an iris drive circuit 26. A focusing operation and a zoom operation of the photographing lens 11 are controlled by a lens drive circuit 27.

An imaging device (CCD) 28 is disposed on an optical axis of the photographing lens 11. A subject image is formed on a light receiving surface of the CCD 28 through the photographing lens 11, and an electric charge corresponding to the subject image is generated therein. An operation, such as an accumulating operation and a reading operation of the electric charge of the CCD 28, is controlled by a CCD drive circuit 30. An electric charge signal, i.e., an image signal, read from the CCD 28 is amplified by an amplifier 31, and is converted from an analog signal to a digital signal by an A/D converter 32. The digital image signal is subjected to a process, such as a gamma correction, in an image signal process circuit 33, and is stored as digital image data in an image memory 34. The iris drive circuit 26, the lens drive circuit 27, the CCD drive circuit 30 and the image signal process circuit 33 are controlled by a system control circuit 35.

The digital image data are read from the image memory 34, and supplied to an LCD drive circuit 36, which is operated in accordance with the digital image data, so that an image corresponding to the digital image data is indicated on an image indication LCD panel 37.

The digital image data read from the image memory 34 are also transmitted to a TV signal encoder 38, so that the digital image data can be transmitted to a peripheral monitor device 39, provided externally to the camera body 10, through the video output terminal 20. The system control circuit 35 is connected to an interface circuit 40, which in turn is connected to an interface connector 21. Therefore, the digital image data read from the image memory 34, can also be transmitted to a computer 41 connected to the interface connector 21. Further, the system control circuit 35 is connected to an image recording device 43 through a recording medium control circuit 42. Therefore, the digital image data read from the image memory 34 can be recorded in a recording medium M, such as an IC memory card, mounted in the image recording device 43.

A luminous-flux emitting element control circuit 44 is connected to the system control circuit 35. The light emitting device 14 is provided with a luminous-flux emitting element 14a and an illumination lens 14b, and an operation of the luminous-flux emitting element 14a is controlled by the luminous-flux emitting element control circuit 44. The luminous-flux emitting element 14a radiates a laser beam, which is a distance measuring light beam, and which irradiates a whole of a measurement subject through the illumination lens 14b. The laser beam, reflected by the measurement subject, becomes incident on the photographing lens 11. By detecting the laser beam with the CCD 28 provided with a plurality of photo-diodes, which are two-dimensionally disposed on a surface thereof, a three-dimensional image is sensed, as described later.

The liquid crystal display panel 16 and a switch group 45, including the release switch 15, the mode change dial 17 and the V/D mode switch 18, are connected to the system control circuit 35.

Figure 3:
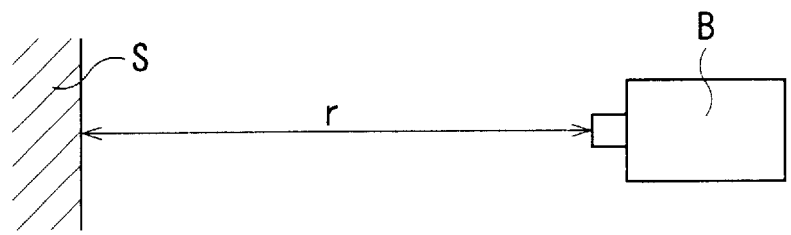
FIG. 3 is a view showing a principle behind a distance measurement.
Figure 4:
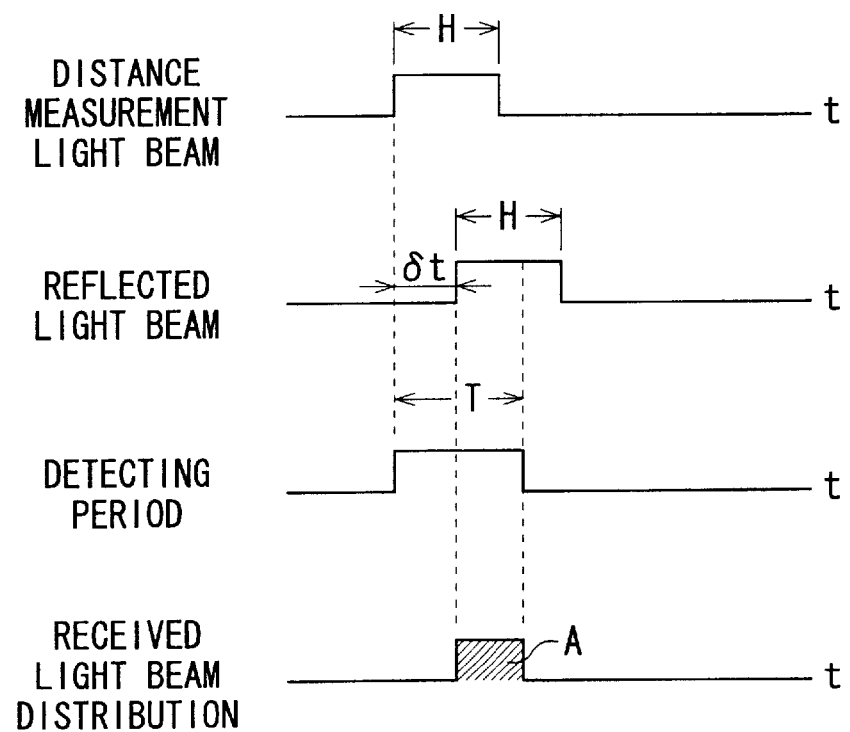
FIG. 4 is a timing chart showing a distance measurement light beam, a reflected light beam, a gate pulse and a distribution of an amount of a light beam received by a CCD.

With reference to FIGS. 3 and 4, a principle behind a distance measurement in the embodiment is described below. Note, in FIG. 4, the abscissa indicates time "t".

A distance measuring light beam output by a distance measurement device B is reflected by a measurement subject S, and the reflected light beam is sensed by a CCD (not shown). The distance measuring light beam is a pulse, a width of which is "H". Accordingly, the reflected light beam is a pulse, a width of which is "H", similarly to the distance measuring light beam. Therefore, a rise of the pulse of the reflected light beam occurs after a rise of the pulse of the distance measuring light beam by a time δ·t (δ is a delay coefficient). Since the distance measuring light beam and the reflected light beam have both traveled a distance "r" between the distance measurement device B and the measurement subject S, the distance "r" is represented as follows:

$$r = \delta \cdot t \cdot C/2 + tm \quad (1)$$

wherein "C" is the velocity of light.

For example, by setting a condition in such a manner that the reflected light beam can only be sensed from a rise of the pulse of the distance measuring light beam to a point prior to a fall of the pulse of the reflected light beam, i.e., by providing a gate pulse corresponding to a reflected light beam detecting period T, an amount "A" of received light from the reflected light beam becomes a function of the distance "r". Namely, the greater the distance "r" (or the greater the time $\delta \cdot t$), the less the received light amount A.

In the embodiment, by taking advantage of the principle described above, the received light amount A is sensed using each of the photo-diodes (photoelectric conversion elements) of the CCD 28, the distance from the camera body 10 to each point on the surface of the measurement subject S is sensed, and data of the three-dimensional image, which indicates a topography of the measurement subject S, can be obtained concurrently.

Figure 5:
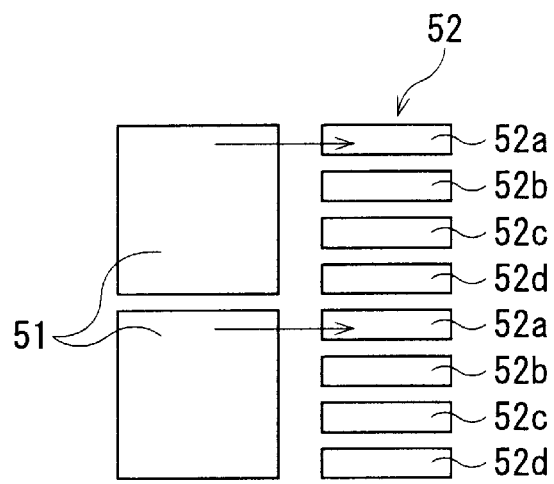
FIG. 5 is a plan view showing a disposition of photo-diodes and a vertical transfer unit, which are provided in the CCD.
Figure 6:
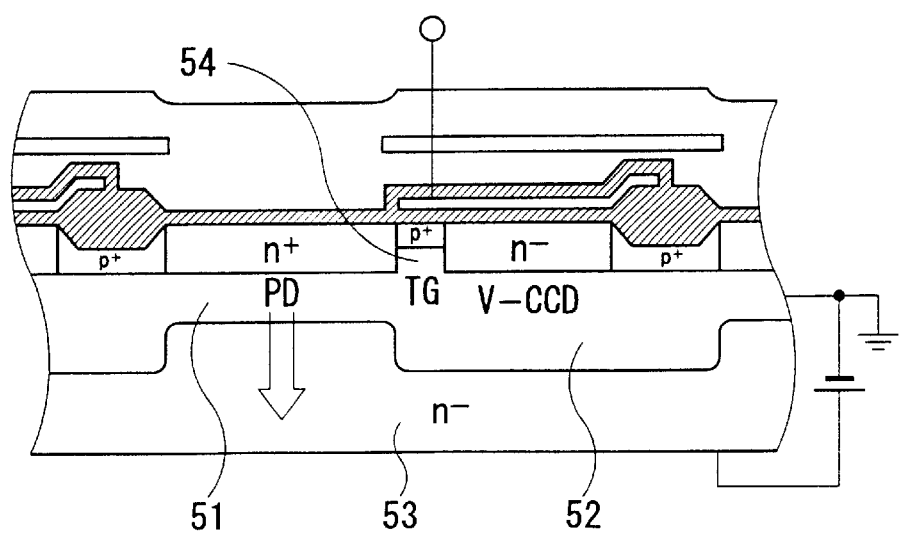
FIG. 6 is a sectioned elevational view of the CCD.

FIG. 5 is a plan view showing a disposition of the photo-diodes 51 and a vertical transfer unit 52, which are provided in the CCD 28. Actually, a multitude of photo-diodes 51 are arranged in a matrix, and a corresponding vertical transfer unit 52 is disposed beside each vertical column of photo-diodes 51. FIG. 6 is a sectioned elevational view of the CCD 28 in which the CCD 28 is cut in a plane perpendicular to a substrate 53. The CCD 28 is an interline CCD of vertical overflow drain (VOD) type, in which unwanted charge is discharged to the substrate 53.

The photo-diodes 51 and the vertical transfer unit (signal charge holding unit) 52 are formed along a surface of the n-type substrate 53. A plurality of the photo-diodes 51 are two-dimensionally disposed in a matrix arrangement, and the vertical transfer unit 52 is disposed adjacent to the photo-diodes 51, parallel to rows extending in a vertical direction in FIG. 5. The vertical transfer unit 52 has four vertical transfer electrodes 52a, 52b, 52c and 52d, which correspond to each of the photo-diodes 51. Therefore, in the vertical transfer unit 52, four potential wells can be formed, so that a signal charge is output from the CCD 28 by controlling a depth of the wells, as is well-known. Note that a number of the vertical transfer electrodes can be changed, depending upon a requirement of the CCD 28.

The photo-diodes (PD) 51 and the vertical transfer unit (V-CCD, being a signal charge holding unit) 52 are disposed in a p-type well formed on a surface of the substrate 53. The p-type well is completely depleted due to an inverse-bias voltage applied between the p-type well and the n-type substrate 53. In this state, electric charge is accumulated in the photo-diodes 51, and an amount of the electric charge corresponds to an amount of an incident light beam, which is the reflected light beam reflected by the measurement subject. When a substrate voltage is changed to a value greater than a predetermined value, electric charge accumulated in the photo-diodes 51 is discharged to the substrate 53. Conversely, when an electric charge transfer signal, which is a voltage signal, is applied to a transfer gate (TG) 54, the electric charge accumulated in the photo-diodes 51 is transferred to the vertical transfer unit 52. Namely, after the electric charge is discharged to the substrate 53 by the electric charge discharging signal, the signal charge accumulated in the photo-diodes 51 is transferred to the vertical transfer unit 52 by the electric charge transfer signal. By repeating the discharge and the transfer, an electronic shuttering operation is performed.

FIG. 7 is a timing chart of a distance information sensing operation by which data, corresponding to the distance from the camera body 10 to each point on a surface of the measurement subject, is sensed. The distance information sensing operation is described below with reference to FIGS. 1, 2, 5, 6 and 7.

In synchronization with an output of a vertical synchronizing signal S1, an electric charge discharging signal (a pulse signal) S2 is output, so that unwanted charge, which is accumulated in the photo-diodes 51, is discharged to the substrate 53. Approximately simultaneously with a completion of the output of the electric charge discharging signal S2, the light emitting device 14 is actuated, and thus a distance measuring light beam S3, which is a pulsed beam having a constant pulse-width, is output therefrom. The distance measuring light beam S3 is reflected by the measurement subject, and enters the CCD 28 as a reflected light beam S4. When a predetermined time has elapsed since the output of the distance measuring light beam S3, an electric charge transfer signal (pulse signal) S5 is output, so that an electric charge accumulated in the photo-diodes 51 is transferred to the vertical transfer unit 52. Note that the electric charge transfer signal S5 is output before the output of a pulse of the distance measuring light beam S3 is completed.

Thus, for a period $T_{U1}$ from the end of the output of the electric charge discharging signal S2 to the beginning of the output of the electric charge transfer signal S5, signal charge corresponding to distances from the camera body 10 to the measurement subject is accumulated. Namely, although a period $T_S$, for which the distance measuring light beam S3 is output, and the electric charge accumulation period $T_{U1}$ begin approximately simultaneously, the electric charge accumulation period $T_{U1}$ ends prior to a completion of the period $T_S$, so that only a part of the reflected light beam S4 is detected by the CCD 28. Signal charge S6, generated due to the detected light beam, corresponds to the distance from the camera body 10 to the measurement subject. In other words, the signal charge S6, corresponding to a light beam, which is included in the reflected light beam S4 coming from the measurement subject and which reaches the photo-diodes 51 within the electric charge accumulation period $T_{U1}$, is accumulated in the photo-diodes 51. The signal charge S6 is transferred to the vertical transfer unit 52 by the electric charge transfer signal S5. Note that the period $T_S$, for which the distance measuring light beam S3 is output, can begin prior to the electric charge accumulation period $T_{U1}$, if necessary.

After a predetermined time has elapsed since the output of the electric charge transfer signal S5, the electric charge discharging signal S2 is again output, so that unwanted charge, which is accumulated in the photo-diodes 51 after the transfer of the signal charge S6 to the vertical transfer unit 52, is discharged to the substrate 53. Thus, further signal charge is accumulated in the photo-diodes 51. Then, similarly to the above description, when the electric charge accumulation period $T_{U1}$ has again elapsed, the signal charge S6 is transferred to the vertical transfer unit 52.

The transferring operation of the signal charge S6 to the vertical transfer unit 52 is repeatedly performed until the next vertical synchronizing signal S1 is output. Thus, the signal charge S6 is integrated in the vertical transfer unit 52. The signal charge S6 integrated for one field period, which is between two vertical synchronizing signals S1, corresponds to distance information of the measurement subject, on condition that the measurement subject is stationary for the period between the two vertical synchronizing signals S1.

The detecting operation of the signal charge S6 described above is carried out in all of the photo-diodes 51 provided in the CCD 28. As a result of the detecting operation for one field period, the distance information sensed by the photo-diodes 51 is held in each corresponding vertical transfer unit 52, which is located adjacent to each column of photo-diodes 51. The distance information is output from the CCD 28 by a vertical transferring operation of the vertical transfer units 52 and a horizontal transferring operation of a horizontal transfer unit (not shown). The distance information is then output from the three-dimensional image capturing device, as a three-dimensional image data of the measurement subject.

The reflected light beam sensed by the CCD 28 may be affected by a reflectance of the surface of the measurement subject. Therefore, the distance information, obtained through the reflected light beam, may contain an error resulting from the reflectance. Further, the reflected light beam sensed by the CCD 28 may contain an extra component, such as ambient daylight, being other than the reflected light beam from the measurement subject, which can cause an error. In this embodiment, these errors are corrected and a level of the signal charge S6, which is integrated in the vertical transfer unit 52, is controlled to have a proper value, due to an operation described below.

Figure 10:
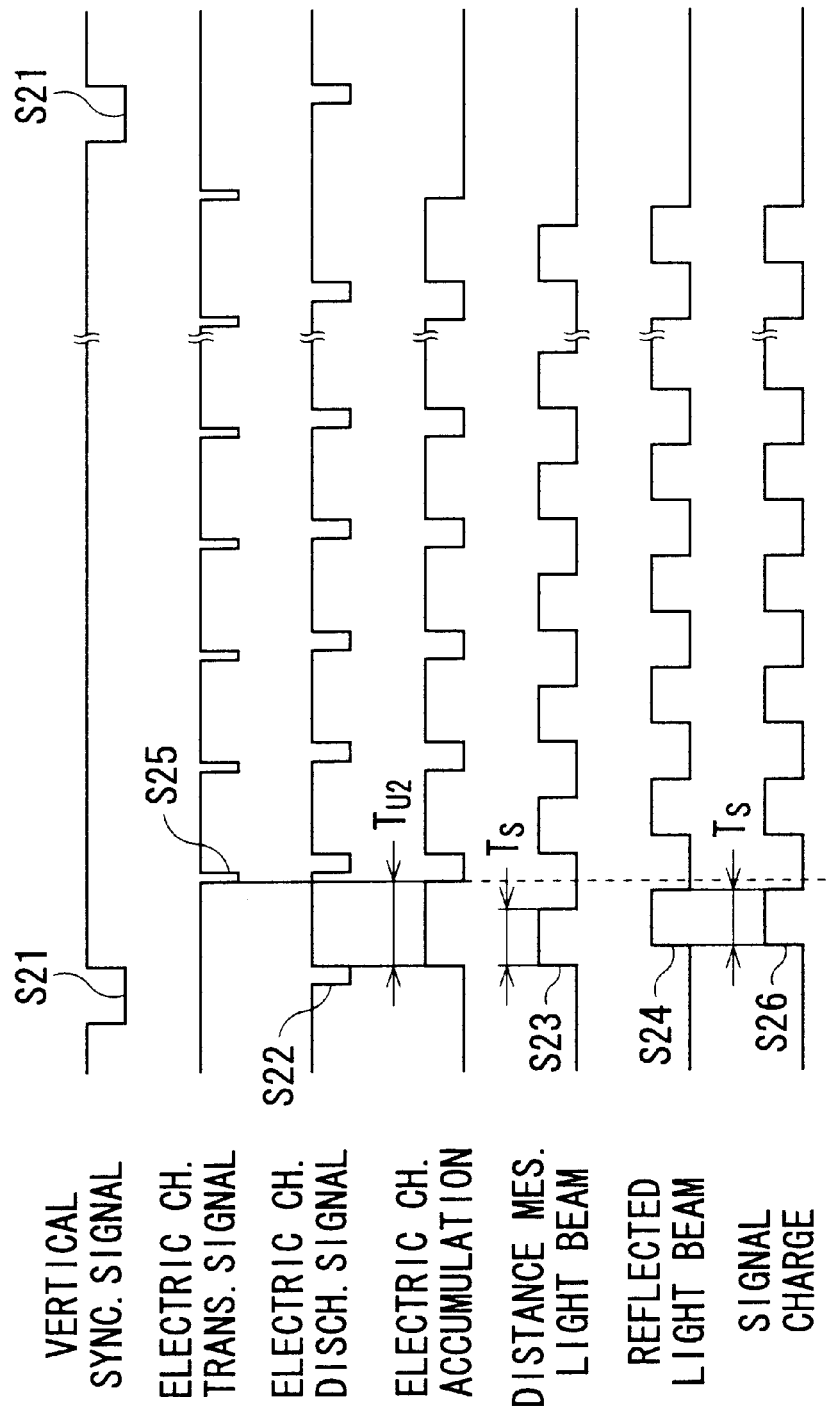
FIG. 10 is a timing chart showing a reflectance information sensing operation.
Figure 11:
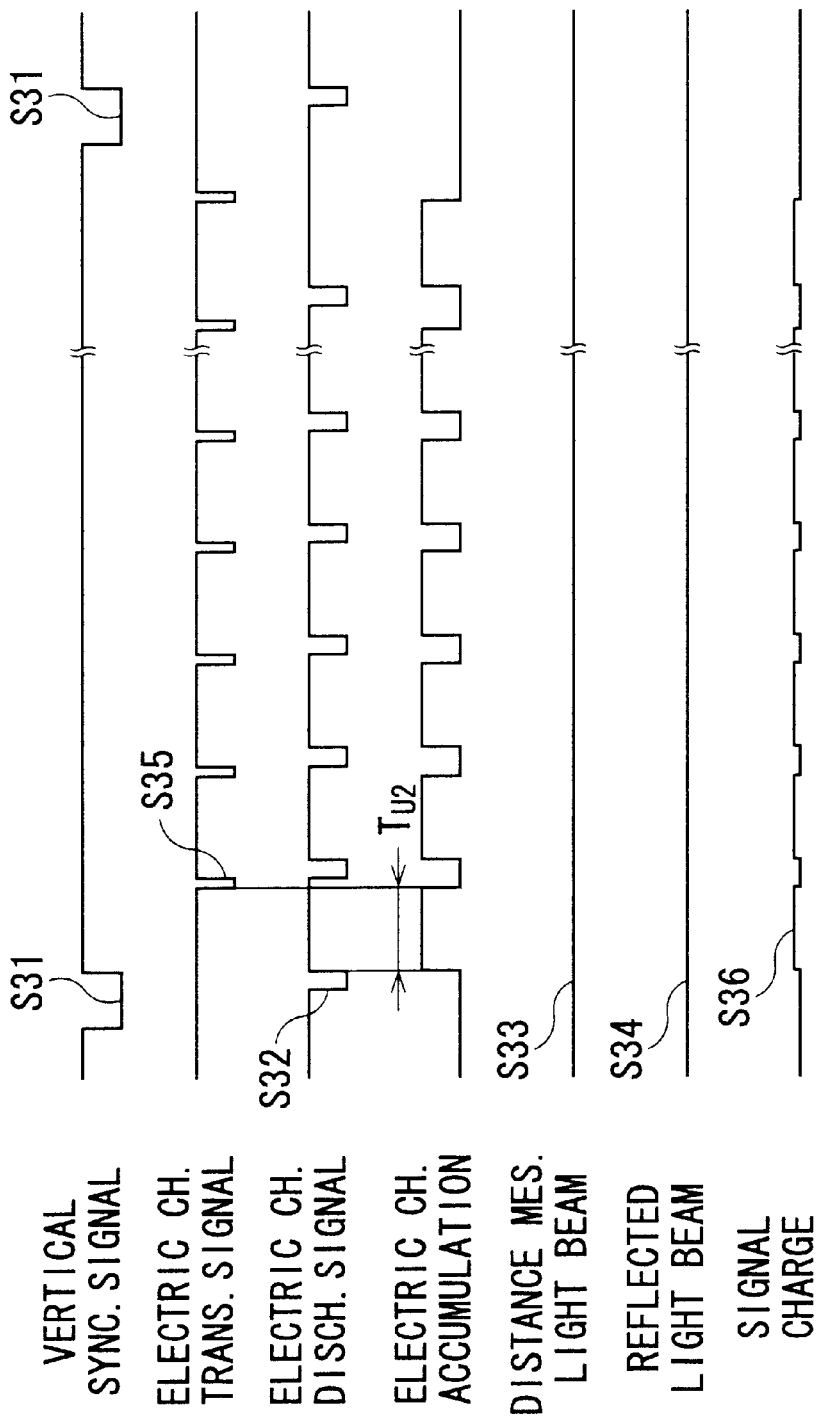
FIG. 11 is a timing chart showing a reflectance correction information sensing operation.

FIGS. 8A through 8D show a flowchart of a program for performing the distance information sensing operation. FIGS. 9, 10 and 11 are timing charts indicating sensing operations of distance correction information, reflectance information and reflectance correction information, respectively. With reference to FIGS. 1, 2, 7, 8A through 8D, 9, 10 and 11, the distance information sensing operation, in which a level of the integrated signal charge with a correction for the reflectance of a surface of the measurement subject, is described below.

When it is determined in Step 101 that the release switch 15 is fully depressed, Step 102 is executed in which it is then determined which mode is selected, a video (V) mode or a distance measurement (D) mode. A change between the modes is carried out by operating the V/D mode switch 18.

When the D mode is selected, Step 103 is executed in which the vertical synchronizing signal S1 is output and a distance measuring light beam control is started. Namely, the light emitting device 14 is driven so that the distance measuring light beam S3 is intermittently output as a pulsed beam. In Step 104, a number of control pulse signals "N" which is to be output for one field period (i.e., a number of electric charge discharging signals S2, electric charge transfer signals S5 and distance measuring light beams S3) is set to an initial value.

Then, Step 105 is executed so that a sensing operation control of the CCD 28 is started. Namely, the distance information sensing operation described with reference to FIG. 7 is started, and thus the electric charge discharging signal S2 and the electric charge transfer signal S5 are alternately output, so that the signal charge S6 of the distance information is integrated in the vertical transfer unit 52.

In Step 106, it is determined whether one field period has elapsed since a beginning of the distance information sensing operation, i.e., whether a new vertical synchronizing signal S1 has been output. When one field period has passed, the process goes to Step 107 in which an integrated value (a distance information signal) of the signal charge S6 of the distance information is output from the CCD 28. The distance information signal is obtained for each pixel forming a single image, and, for example, a number of the distance information signals is 100,000 when the image has 100,000 pixels. Each distance information signal is stored in the image memory 34 in Step 108.

In Step 110, based on all of the distance information signals of the single image, a level assessment value calculation is carried out, in which an assessment value AE, indicating whether the integration of the vertical transfer unit 52 is proper, i.e., whether the number of control pulse signals "N" is proper, is calculated. The calculation will be described later with reference to FIGS. 12 through 14.

In Step 111, it is determined whether the assessment value AE is greater than a reference maximum value Max. When the assessment value AE is greater than the reference maximum value Max, some of the distance information signals could be saturated. Accordingly, in this case, a new number of control pulse signals "Ns", which is obtained by reducing the number of pulse signals "N" by ΔN, is set in Step 112. Then, the process goes back to Step 105, so that a sensing control by the CCD 28 is started again, and a distance information sensing operation is performed.

Conversely, when it is determined in Step 111 that the assessment value AE is less than or equal to the reference maximum value Max, Step 113 is executed in which it is determined whether the assessment value AE is less than a reference minimum value Min. When it is determined that the assessment value AE is less than the reference minimum value Min, it is deemed that the value of the distance information signal is too low to measure the distance, and a new number of control pulse signals "Ns", which is obtained by adding ΔN to the number of pulse signals "N", is set in Step 114. Then, the process goes back to Step 105, so that a sensing control by the CCD 28 is started again, and a distance information sensing operation is performed.

When it is determined in Step 113 that the assessment value AE is greater than or equal to the reference minimum value Min, i.e., when it is determined that the assessment value AE is less than or equal to the reference maximum value Max and is greater than or equal to the reference minimum value Min, Step 120 is executed in which the distance measuring light beam control is turned OFF, and thus the light emitting operation of the light emitting device 14 is stopped.

In Steps 121 through 124, the distance correction information sensing operation is performed. In Step 121, as shown in FIG. 9, a vertical synchronizing signal S11 is output, and a sensing operation control of the CCD 28 is started. Namely, an electric charge discharging signal S12 and an electric charge transfer signal S15 are alternately output while the light emitting operation of the light emitting device 14 is not carried out, i.e., while the light source is not illuminated. Although the electric charge accumulation period $T_{U1}$ is the same as that of the distance information sensing operation shown in FIG. 7, the distance measuring light beam does not irradiate the measurement subject (reference S13), and thus there is no reflected light beam (reference S14). Therefore, although a signal charge of the distance information is not generated, a signal charge S16 corresponding to an interference or noise component is generated, since the noise component, such as ambient daylight, enters the CCD 28. The signal charge S16 corresponds to distance correction information, which is used for correcting an error generated in the distance information due to the noise component, and is related to the electric charge accumulation period $T_{U1}$.

In Step 122, it is determined whether one field period has elapsed since the beginning of the distance correction information sensing operation, i.e., whether a new vertical synchronizing signal S11 has been output. When one field period has passed, the process goes to Step 123 in which the signal charge S16 of the distance correction information is output from the CCD 28. The signal charge S16 is then stored in the image memory 34 in Step 124.

In Steps 125 through 129, the reflectance information sensing operation is performed. In Step 125, as shown in FIG. 10, a vertical synchronizing signal S21 is output, and a distance measuring light beam control of the CCD 28 is started, so that a distance measuring light beam S23 is intermittently output as a pulsed beam. In Step 126, a sensing operation control of the CCD 28 is started, and thus an electric charge discharging signal S22 and an electric charge transfer signal S25 are alternately output. The reflectance information sensing operation is controlled in such a manner that all of the reflected light beam S24 is received within an electric charge accumulation period $T_{U2}$, which is from an end of an output of the electric charge discharging signal S22 to a beginning of an output of the electric charge transfer signal S25. Namely, a width $T_S$ of the signal charge S26 accumulated in each of the photo-diodes 51 of the CCD 28 is the same as a width $T_S$ of the distance measuring light beam S23.

Therefore, the signal charge S26 does not depend upon the distance ("r" in FIG. 3) of the measurement subject, and corresponds only to the reflectance information which depends on the reflectance of the surface of the measurement subject.

In Step 127, it is determined whether one field period has elapsed since the beginning of the reflectance information sensing operation, i.e., whether a new vertical synchronizing signal S21 has been output. When one field period has passed, the process goes to Step 128 in which the signal charge S26 of the reflectance information is output from the CCD 28. The signal charge S26 is then stored in the image memory 34 in Step 129. Then, in Step 130, the distance measuring light beam control is turned OFF, and thus the light emitting operation of the light emitting device 14 is stopped.

In Steps 131 through 134, the reflectance correction information sensing operation is performed. In Step 131, as shown in FIG. 11, a vertical synchronizing signal S31 is output, and a sensing operation control of the CCD 28 is started. Namely, an electric charge discharging signal S32 and an electric charge transfer signal S35 are alternately output while the light emitting operation of the light emitting device 14 is not carried out. Although the electric charge accumulation period $T_{U2}$ is the same as that of the reflectance information sensing operation shown in FIG. 10, the distance measuring light beam does not irradiate the measurement subject (reference S33), and thus there is no reflected light beam (reference S34). Therefore, although a signal charge of the reflectance information is not generated, a signal charge S36 corresponding to an interference component or a noise component is generated, since the noise component, such as ambient daylight, enters the CCD 28. The signal charge S36 corresponds only to reflectance correction information, which is used for correcting an error generated in the reflectance information due to the noise component, and is related to the electric charge accumulation period $T_{U2}$.

In Step 132, it is determined whether one field period has elapsed since the beginning of the reflectance correction information sensing operation, i.e., whether a new vertical synchronizing signal S31 has been output. When one field period has passed, the process goes to Step 133 in which the signal charge S36 of the reflectance correction information is output from the CCD 28. The signal charge S36 is stored in the image memory 34 in Step 134.

Note that the distance correction information, the reflectance information and the reflectance correction information are obtained by integrating signal charges in accordance with the number of the control pulse signals "Ns" or "N" which is set in Step 104, 112 or 114, similarly to the distance information.

In Step 135, a calculation process of the distance measurement (D) data is performed using the distance information, the distance correction information, the reflectance information and the reflectance correction information, which are obtained in Steps 103 through 108, and 120 through 134. The D data is output in Step 136, and the sensing operation ends. Conversely, when it is determined in Step 102 that the V mode is selected, the distance measuring light beam control is turned OFF in Step 137, and a normal photographing operation (i.e., CCD video control) using the CCD 28 is turned ON in Step 138. Then, the sensing operation ends.

With reference to FIGS. 7, 9, 10 and 11, the contents of the calculation executed in Step 135 is described below.

It is supposed that the measurement subject of reflectance R is illuminated and an image of the measurement subject is formed on the CCD 28 while deeming that the measurement subject is a two-dimensional light source. At this time, an output "Sn", which is obtained by integrating an electric charge generated in a photo-diode for an electric charge accumulation period "t", is indicated as follows:

$$Sn = k \cdot R \cdot I \cdot t \qquad (2)$$

wherein "k" is a proportional coefficient, which is varied in accordance with an F-number and a magnification of the photographing lens.

When the measurement subject is illuminated by light output from a light source, such as an infrared laser source, the luminance I is obtained by combining a luminance $I_S$ due to the light source and a luminance $I_B$ due to the ambient light, which is indicated as follows:

$$I = I_S + I_B \qquad (3)$$

As shown in FIG. 7, it is supposed that the electric charge accumulation period is $T_{U1}$, the pulse width of the distance measuring light beam S3 is $T_S$, a pulse width of the signal charge S6 of the distance information is $T_D$, and the electric charge accumulation period is repeated N times for one field period. An output $SM_{10}$ of the CCD is:

$$SM_{10} = \sum (k \cdot R(I_S \cdot T_D + I_B \cdot T_{U1})) \qquad (4)$$
$$= k \cdot N \cdot R(I_S \cdot T_D + I_B \cdot T_{U1})$$

wherein the pulse width $T_D$ is indicated as follows:

$$T_D = T_{U1} - \delta \cdot t \qquad (5)$$
$$= T_{U1} - 2r/C$$

As shown in FIG. 10, when the electric charge accumulation period $T_{U2}$ is greater than the pulse width $T_s$, such that the electric charge accumulation period $T_{U2}$ is large enough to receive the whole of the reflected light beam, an output $SM_{20}$ of the CCD is:

$$SM_{20} = \sum (k \cdot R(I_S \cdot T_S + I_B \cdot T_{U2})) \qquad (6)$$
$$= k \cdot N \cdot R(I_S \cdot T_S + I_B \cdot T_{U2})$$

As shown in FIG. 9, when the light beam is turned OFF to carry out a pulse-shaped electric charge accumulation, having a same width as that of FIG. 7, an output $SM_{11}$ of the CCD is:

$$SM_{11} = \sum (k \cdot R \cdot I_B \cdot T_{U1}) \qquad (7)$$
$$= k \cdot N \cdot R \cdot I_B \cdot T_{U1}$$

Similarly, an output $SM_{21}$ of the CCD, which is obtained when an electric charge accumulation shown in FIG. 11 is performed, is $$SM_{21} = \sum (k \cdot R \cdot I_B \cdot T_{U2}) \qquad (8)$$
$$= k \cdot N \cdot R \cdot I_B \cdot T_{U2}$$

Based on the formulas (4), (6), (7) and (8), a following formula is obtained:

$$S_D = (SM_{10} - SM_{11})/(SM_{20} - SM_{21}) \qquad (9)$$
$$= T_D / T_S$$

As described above, the distance measuring light beam S3 and the reflected light beam S4 contain noise, such as ambient daylight (i.e., a luminance $I_B$ due to ambient daylight). $T_D/T_S$ included in the formula (9) indicates that an amount of the reflected light beam S4 from the measurement subject, when the distance measuring light beam S3 is radiated, is normalized by an amount of the distance measuring light beam S3, and is equal to a ratio of a value in which the noise component ($SM_{11}$) (corresponding to the electric charge S16 shown in FIG. 9) is subtracted from the amount of the distance measuring light beam S3 ($SM_{10}$) (corresponding to the signal charge S6 shown in FIG. 7), to a value in which the noise component ($SM_{21}$) (corresponding to the electric charge S36 shown in FIG. 11) is subtracted from an amount of the reflected light beam S4 ($SM_{20}$) (corresponding to the signal charge S26 shown in FIG. 10).

$SM_{10}$, $SM_{11}$, $SM_{20}$ and $SM_{21}$ included in the formula (9) are stored as the distance information, the distance correction information, the reflectance information and the reflectance correction information, in Steps 108, 124, 129 and 134, respectively. Therefore, based on the information, $T_D/T_S$ is obtained. Since the pulse width $T_S$ is known, the distance "r" is obtained from formula (5) and $T_D/T_S$.

Thus, based on the formulas (5) and (9), the distances "r" from the camera body to each point on the surface of the measurement subject are corrected, so that an accuracy of a distance sensing is improved.

Figure 8A:
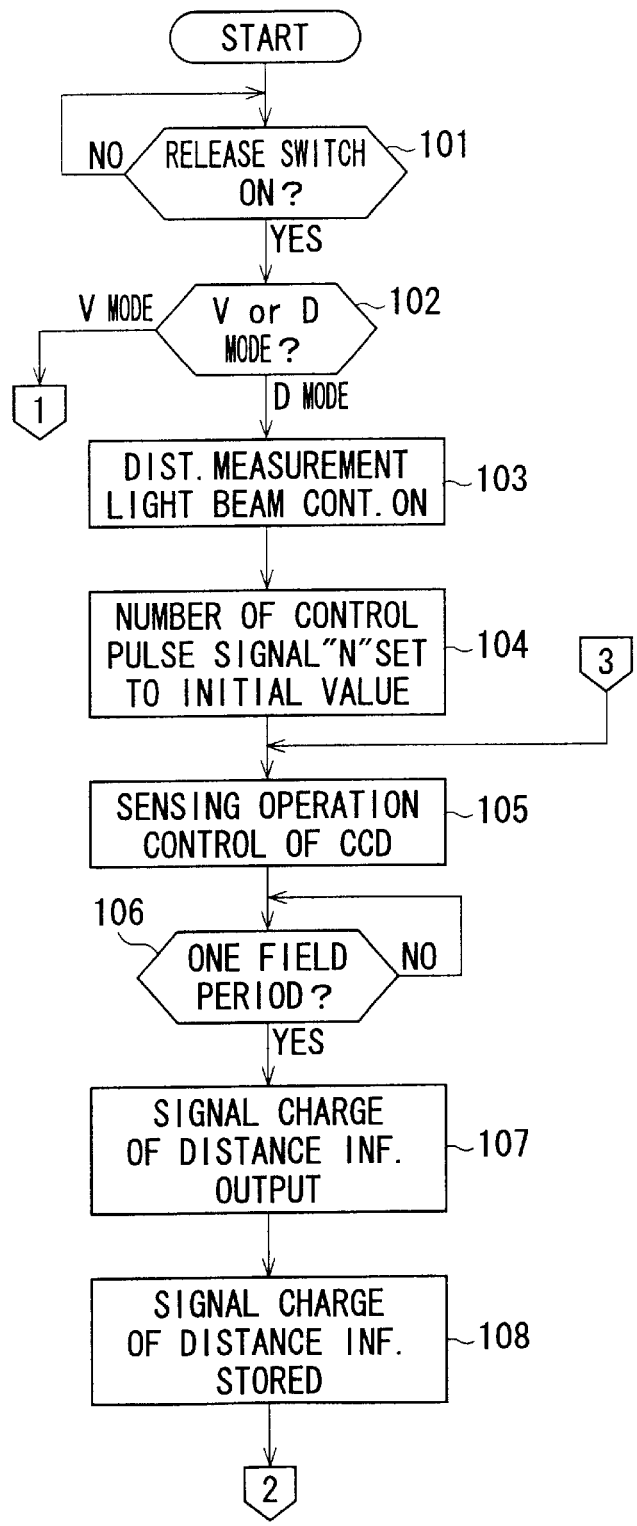
FIGS. 8A through 8D show a flowchart of a program for performing the distance information sensing operation.
Figure 8B:
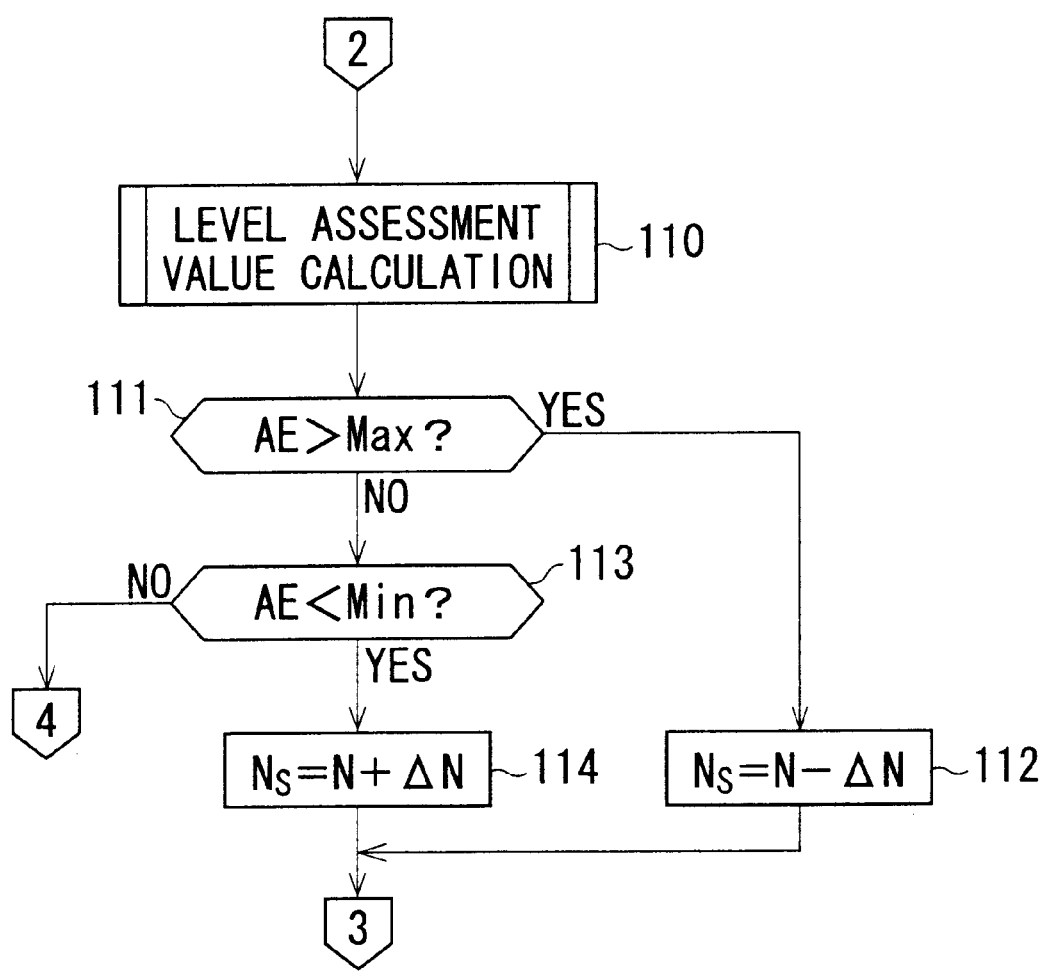
Figure 8C:
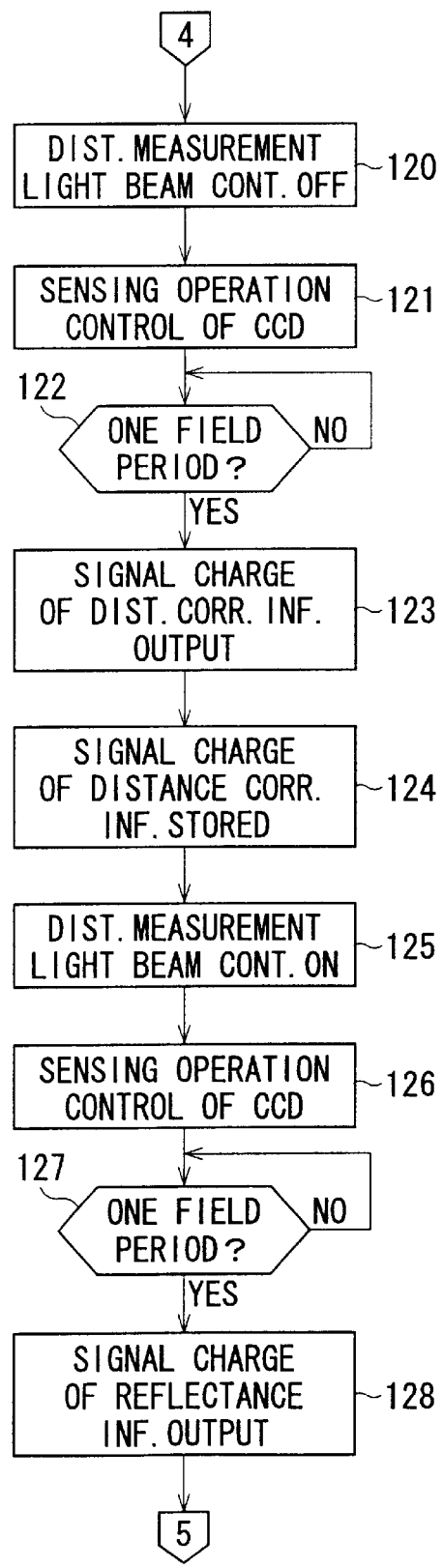
Figure 8D:
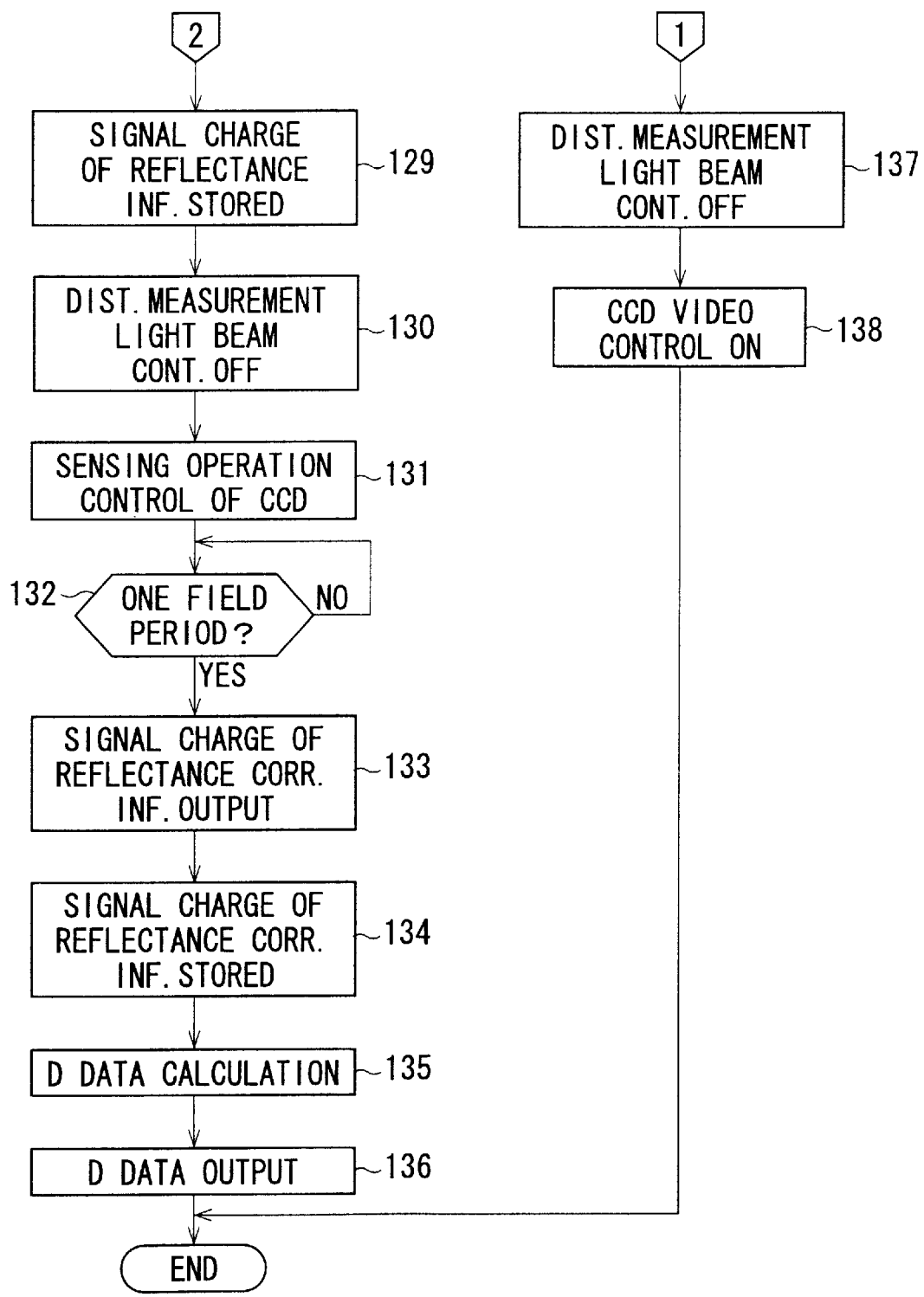
Figure 12:
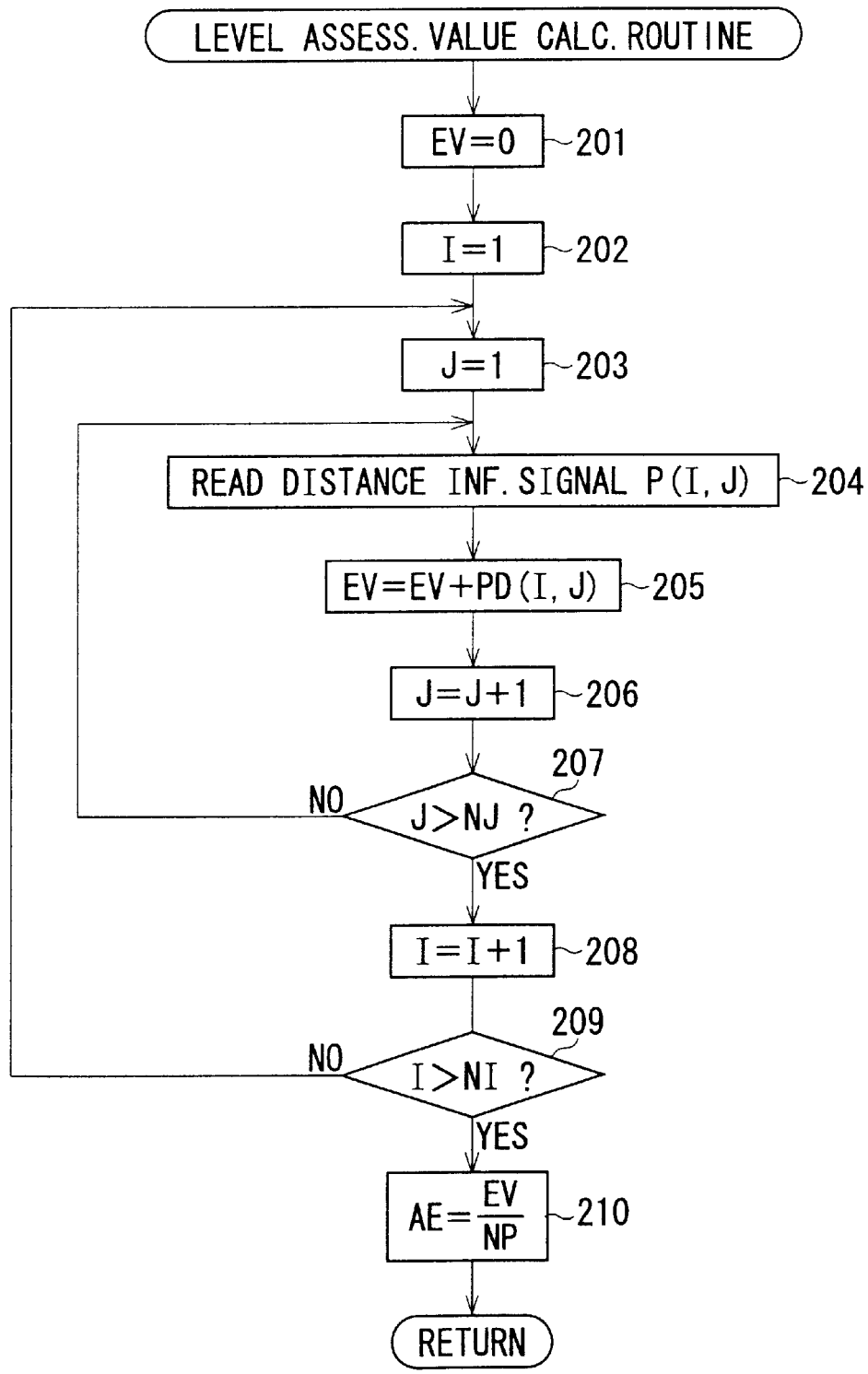
FIG. 12 is a flowchart showing a first example of a level assessment value calculation routine.

FIG. 12 is a flowchart showing a first example of a level assessment value calculation routine executed in Step 110, shown in FIG. 8B. The assessment value AE obtained in this example is a mean value of levels of the signal charge (i.e., distance information signals) corresponding to all of the pixels which are obtained from the CCD 28.

In Step 201, an initial value of a value EV, which is a sum of the distance information signals corresponding to all of the pixels, is set to 0. In Step 202, an initial value of a parameter I, indicating a vertical position of a pixel in the image, is set to 1, and in Step 203, an initial value of a parameter J, indicating a horizontal position of a pixel in the image, is also set to 1.

In Step 204, a distance information signal P(I,J) is read from the image memory 34. In Step 205, the distance information signal P(I,J), read from the image memory 34 in step 204, is added to a sum value EV, which has been obtained so far.

In Step 206, 1 is added to the horizontal parameter J. When it is determined in Step 207 that the added parameter J is less than or equal to a number of all pixels NJ, which are aligned in a horizontal direction, i.e., when the addition has not been completed for all of the horizontally aligned pixels, the process goes back to Step 204, in which a distance information signal P(I,J) of a next pixel is read from the image memory 34.

When it is determined in Step 207 that the parameter J is greater than the number of all of the horizontally aligned pixels NJ, Step 208 is executed in which 1 is added to the vertical parameter I. When it is determined in Step 209 that the added parameter I is less than or equal to a number of all pixels NI, which are aligned in a vertical direction, i.e., when the addition has not been completed for all of the vertically aligned pixels, the process goes back to Step 203, in which the horizontal parameter J is set to the initial value "1", and a loop composed of Steps 204 through 207 is executed again.

Thus, when the distance information signals P(I,J) regarding all of the pixels are summed up, Step 210 is executed in which a sum value EV, occurring at this point, is divided by a number of all of the pixels NP (=NJ×NI), so that a mean value or an arithmetic mean of the distance information signals regarding all of the pixels is obtained as the assessment value AE.

In the first example of the level assessment value calculation routine, a mean value of the distance information signals of all of the pixels is obtained as the assessment value AE. Therefore, in the distance information sensing routine shown in FIGS. 8A through 8D, the number of the control pulse signals N is set based on the mean value of the signal levels of all of the pixels obtained from the CCD 28.

Figure 13:
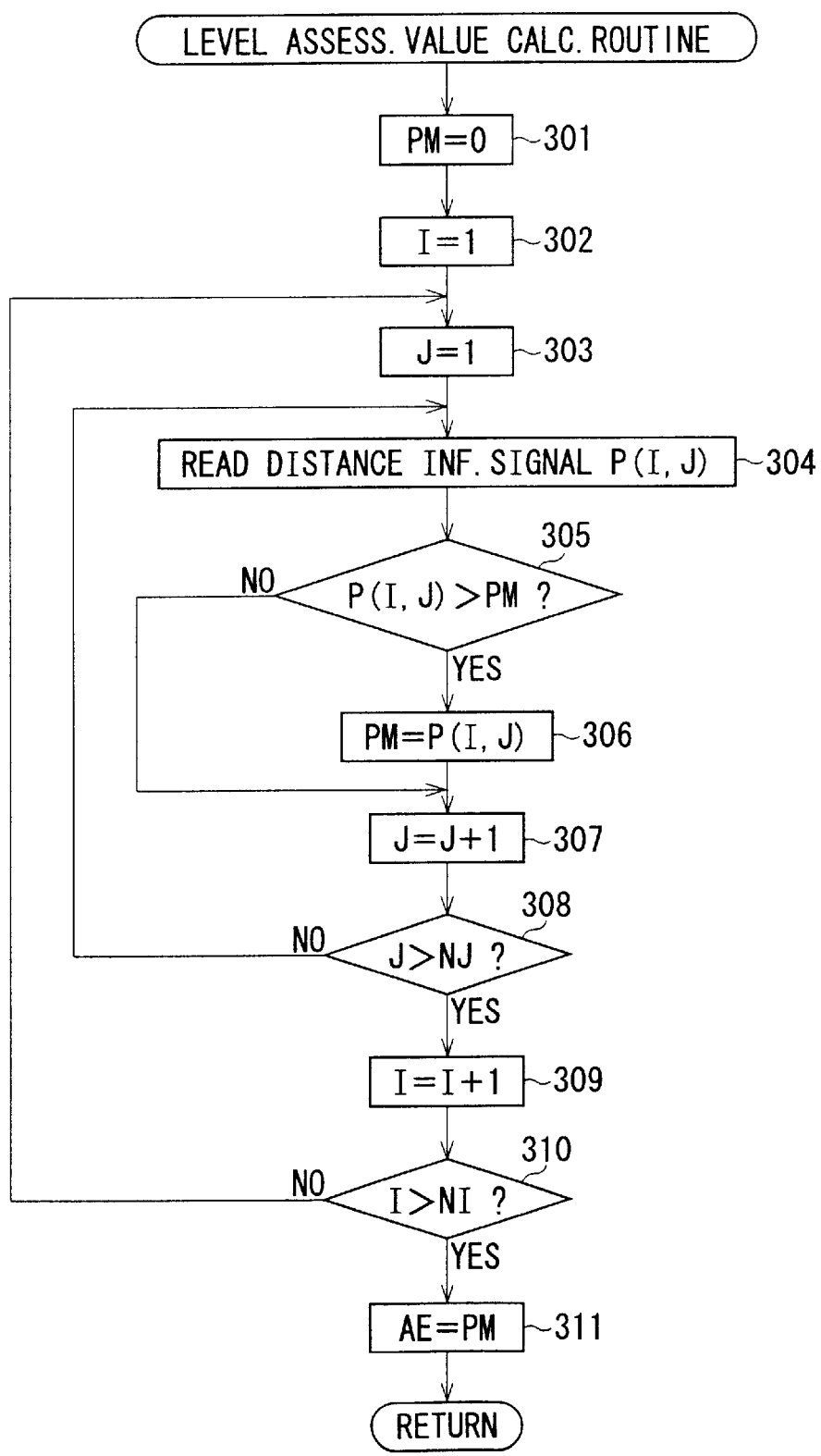
FIG. 13 is a flowchart showing a second example of the level assessment value calculation routine.

FIG. 13 is a flowchart showing a second example of the level assessment value calculation routine. The assessment value AE obtained in this example is a maximum value of the distance information signals of all of the pixels.

In Step 301, an initial value of a maximum value PM of the distance information signals is set to 0. In Step 302, an initial value of a parameter I, indicating a vertical position of a pixel in the image, is set to 1, and in Step 303, an initial value of a parameter J, indicating a horizontal position of a pixel in the image, is set to 1.

In Step 304, a distance information signal P(I,J) is read from the image memory 34. In Step 305, it is determined whether the distance information signal P(I,J), read from the image memory 34 in step 304, is greater than a maximum value PM which has been obtained so far. When the distance information signal P(I,J) is greater than the maximum value PM, Step 306 is executed in which the distance information signal P(I,J) becomes a new maximum value PM. Conversely, when it is determined in Step 305 that the distance information signal P(I,J) is less than or equal to the maximum value PM, which has been obtained so far, the execution of Step 306 is skipped.

After the execution of Step 305 and/or 306, Step 307 is executed in which 1 is added to the horizontal parameter J. In Step 308, it is determined whether the added parameter J is greater than a number of all pixels NJ, which are aligned in a horizontal direction. When it is determined that the added parameter J is less than or equal to the number of all pixels NJ, the process goes back to Step 304, in which a distance information signal P(I,J) of a next pixel is read from the image memory 34.

When it is determined in Step 308 that the parameter J is greater than the number of all of the horizontally aligned pixels NJ, Step 309 is executed in which 1 is added to the vertical parameter I. When it is determined in Step 310 that the added parameter I is less than or equal to a number of all pixels NI, which are aligned in a vertical direction, i.e., when the addition has not been completed for all of the vertically aligned pixels, the process goes back to Step 303, in which the horizontal parameter J is set to the initial value "1", and a loop composed of Steps 304 through 308 is executed again.

Thus, when the distance information signals P(I,J), regarding all of the pixels, have been obtained, the process moves from Step 310 to Step 311, in which a maximum value PM, occurring at this point, is set as the assessment value AE.

Thus, in the second example, the maximum value of the distance information signals of all of the pixels is obtained as the assessment value AE. Therefore, in the distance information sensing routine shown in FIGS. 8A through 8D, the number of the control pulse signals N is set based on the maximum value of the signal levels of all of the pixels obtained from the CCD 28.

Figure 14:
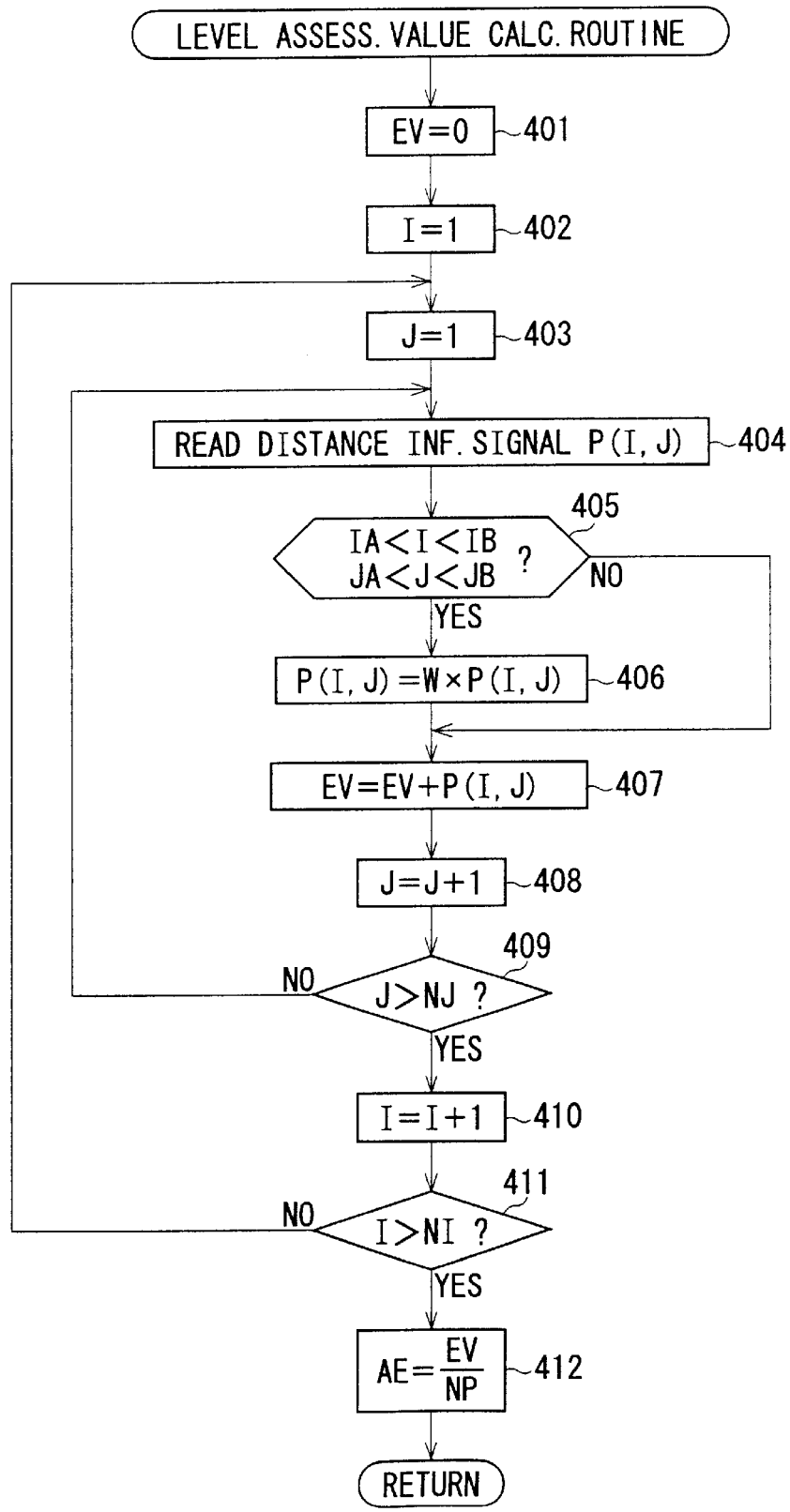
FIG. 14 is a flowchart showing a third example of the level assessment value calculation routine.

FIG. 14 is a flowchart showing a third example of the level assessment value calculation routine. The assessment value AE obtained in this example is obtained by weighting the distance information signals from a part of the pixels, which are positioned at a center of the image, for example.

In Step 401, an initial value of a value EV, which is a sum of the distance information signals corresponding to all of the pixels, is set to 0. In Step 402, an initial value of a parameter I, indicating a vertical position of a pixel in the image, is set to 1, and in Step 403, an initial value of a parameter J, indicating a horizontal position of a pixel in the image, is set to 1.

In Step 404, a distance information signal P(I,J) is read from the image memory 34. In Step 405, it is determined whether the vertical parameter I is between two boundary values IA and IB and the horizontal parameter J is between two boundary values JA and JB. When the parameters I and J are between the corresponding boundaries, respectively, i.e., when the distance information signal P(I,J) corresponds to the center of the image, for example, Step 406 is executed in which the distance information signal P(I,J) is multiplied by a weighted value W. Conversely, when both of the parameters I and J are not between the corresponding boundaries, respectively, Step 406 is skipped.

In Step 407, the distance information signal P(I,J), read from the image memory 34 in step 404, and multiplied by the weighted value W when corresponding to a pixel between the predetermined boundaries, is added to a sum value EV, which has been obtained so far.

In Step 408, 1 is added to the horizontal parameter J. When it is determined in Step 409 that the added parameter J is less than or equal to a number of all pixels NJ, which are aligned in a horizontal direction, i.e., when the addition has not been completed for all of the horizontally aligned pixels, the process goes back to Step 404, in which a distance information signal P(I,J) of a next pixel is read from the image memory 34.

When it is determined in Step 409 that the parameter J is greater than the number of all of the horizontally aligned pixels NJ, Step 410 is executed in which 1 is added to the vertical parameter I. When it is determined in Step 411 that the added parameter I is less than or equal to a number of all pixels NI, which are aligned in a vertical direction, i.e., when the addition has not been completed for all of the vertically aligned pixels, the process goes back to Step 403, in which the horizontal parameter J is set to the initial value "1", and a loop composed of Steps 404 through 409 is executed again.

Thus, when the distance information signals P(I,J) are summed up regarding all of the pixels, Step 412 is executed in which a sum value EV, occurring at this point, is divided by a number of all of the pixels NP, so that a mean value or an arithmetic mean of the distance information signals regarding all of the pixels is obtained as the assessment value AE.

Thus, in the third example of the level assessment value calculation routine, a mean value of the distance information signals of all of the pixels is calculated, in such a manner that distance information signals corresponding to a predetermined part of the image are multiplied by the weighted value, to obtain the assessment value AE. Namely, in the distance information sensing routine shown in FIGS. 8A through 8D, the number of the control pulse signals N is set with a weighting on the signal levels of a part of the pixels obtained from the CCD 28.

As described above, according to the embodiment, since an optical shutter need not be provided, the three-dimensional image capturing device can be miniaturized and manufactured at a low cost. Further, the embodiment is constructed in such a manner that a plurality of electric charge discharging signals (pulse signals) are output to integrate the signal charge S6 so that distances, from the camera body to the measurement subject, are sensed concurrently. Therefore, an output signal of the three-dimensional image capturing device can have a higher level (output signal), in comparison with a conventional device.

Furthermore, according to the embodiment, the distance information, which is three-dimensional image data regarding the topography of the measurement subject, is detected and accumulated concurrently without a need for scanning the distance measuring light beam over the measurement subject. Accordingly, a time over which the three-dimensional image of the measurement subject is obtained can be drastically shortened.

Further, in the embodiment, since the number of control pulse signals N is adjusted in accordance with the output levels of the distance information signals regarding all of the pixels, the levels of the distance information signals can be adjusted to have proper values. Namely, a condition in which the distance information signals are saturated due to a number of the control pulse signals N being too high, or a condition in which the levels of the distance information signals become too low, due to a number of the control pulse signals N being too low, is prevented. Therefore, according to the embodiment, a situation in which the levels of the distance information signals deviate from a predetermined range, because of a reflectance of a surface of the measurement subject, or an ambient condition of the measurement subject, is prevented, enabling the surface of the measurement subject to be measured with a high accuracy.

Note that, regarding the calculation of the assessment value AE, it is not necessary to take into consideration the distance information signals of all of the pixels. Namely, the assessment value AE can be obtained based on the distance information signals of only a selection of the pixels, and in this case, the parameters NJ and NI in Steps 207 and 209 of FIG. 12, in Steps 308 and 310 of FIG. 13, and in Steps 409 and 411 of FIG. 14 indicate values less than the maximum numbers of horizontal or vertical pixels. In the other example, Steps 202 through 209 of FIG. 12, Steps 302 through 310 of FIG. 13, and 15 Steps 402 through 411 of FIG. 14 may be performed in such a manner that the assessment values AE are obtained based on the distance information signals corresponding to the center portion of the image.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 10-187213 (filed on Jul. 2, 1998) which is expressly incorporated herein, by reference, in its entirety.

What is claimed is:

1. A three-dimensional image capturing device, comprising:
   a light source that radiates a distance measuring light beam irradiating a measurement subject, said measurement subject reflecting said distance measuring light beam to generate a reflected light beam;
   a plurality of photoelectric conversion elements that receive said reflected light beam, so that electric charge corresponding to an amount of said received reflected light beam is accumulated in each of said photoelectric conversion elements;
   a signal charge holding unit disposed adjacent to each of said photoelectric conversion elements;
   an electric charge discharging processor that discharges unwanted charge accumulated in each of said photoelectric conversion elements, so that an accumulating operation of signal charge is started in each of said photoelectric conversion elements;
   a signal charge transfer processor that transfers said signal charge accumulated in said photoelectric conversion elements to said signal charge holding unit;
   a signal charge integrating processor that outputs control pulse signals to drive said electric charge discharging processor and said signal charge transfer processor alternately, in accordance with a number of said control pulse signals, for a predetermined period, so that said signal charge is integrated in said signal charge holding unit; and
   a signal level adjusting processor that controls said number of said control pulse signals to adjust a level of said signal charge, said signal level adjusting processor configured to:
      obtain distance information from said signal charge; and
      adjust, in accordance with a level assessment value that indicates whether the number of said control pulse signals is proper, the number of said control pulse signals.

2. A device according to claim 1, further comprising an assessment value obtaining processor that obtains an assessment value in accordance with which said number of said control pulse signals is adjusted, said assessment value being a mean value of levels of said signal charge generated by at least a portion of said photoelectric conversion elements.

3. A device according to claim 2, wherein said mean value is obtained by weighting said levels of said signal charge generated by a part of said portion of said photoelectric conversion elements.

4. A device according to claim 1, further comprising an assessment value obtaining processor that obtains an assessment value in accordance with which said number of said control pulse signals is adjusted, said assessment value being a maximum value of levels of said signal charge generated by at least a portion of said photoelectric conversion elements.

5. A device according to claim 1, wherein said photoelectric conversion elements are formed on a substrate, and said electric charge discharging processor discharges said unwanted charge to said substrate.

6. A device according to claim 1, wherein said signal charge holding unit is provided in a vertical transfer unit that outputs said signal charge from said image capturing device.

7. A device according to claim 1, wherein said photoelectric conversion elements and said signal charge holding units are formed as a vertical overflow drain type of interline CCD.

8. A device according to claim 1, wherein said electric charge discharging processor outputs an electric charge discharging signal to discharge said unwanted charge, and said signal charge holding processor outputs an electric charge transfer signal to transfer said signal charge to said signal charge holding unit, said electric charge discharging signal and said electric charge transfer signal being pulse signals.

9. A device according to claim 8, wherein said distance measuring light beam is a pulsed beam having a predetermined pulse width, a first accumulating period, which is from an output of said electric charge discharging signal to an output of said electric charge transfer signal, being set such that an amount of said reflected light beam received corresponds to a distance between said measurement subject and said image capturing device, so that said signal charge corresponding to distance information regarding said measurement subject is integrated in said signal charge holding unit.

10. A device according to claim 9, wherein a second accumulating period, which is from an output of said electric charge discharging signal to an output of said electric charge transfer signal, is set such that said reflected light beam is received in entirety, so that signal charge, corresponding to reflectance information related to a reflectance of said measurement subject, is integrated in said signal charge holding unit, and said distance information is normalized by said reflectance information, so that an influence of a reflectance contained in said distance information is reduced.

11. A device according to claim 10, wherein distance correction information is sensed by said three-dimensional image capturing device using said first accumulating period when said light source is turned OFF, and said distance information is normalized using said distance information corrected by said distance correction information and said reflectance information.

12. A device according to claim 11, wherein:
   distance correction information is sensed by said three-dimensional image capturing device using said first accumulating period when said light source is turned OFF;
   reflectance correction information is sensed by said three-dimensional image capturing device using said second accumulating period when said light source is turned OFF; and
   said distance information is normalized using said distance information corrected by said distance correction information, and said reflectance information corrected by said reflectance correction information.

13. A device according to claim 1, wherein said signal charge corresponds to a distance from the device to said measurement subject.

14. A three-dimensional image capturing device, comprising:
- a light source that radiates a distance measuring light beam irradiating a measurement subject, said measurement subject reflecting said distance measuring light beam to generate a reflected light beam;
- a plurality of photoelectric conversion elements that receive said reflected light beam, so that electric charge corresponding to an amount of said received reflected light beam is accumulated in each of said photoelectric conversion elements;
- a signal charge holding unit disposed adjacent to each of said photoelectric conversion elements;
- an electric charge discharging processor that discharges unwanted charge accumulated in each of said photoelectric conversion elements, so that an accumulating operation of signal charge is started in each of said photoelectric conversion elements;
- a signal charge transfer processor that transfers said signal charge accumulated in said photoelectric conversion elements to said signal charge holding unit;
- a signal charge integrating processor that drives said electric charge discharging processor and said signal charge transfer processor alternately, so that said signal charge is integrated in said signal charge holding unit; and
- a signal level adjusting processor that controls a number of operations by which said signal charge integrating processor drives said electric charge discharging processor and said signal charge transfer processor alternately, so that a level of said signal charge is adjustable, said signal level adjusting processor configured to:
    obtain distance information from said signal charge; and
  adjust, in accordance with a level assessment value that indicates whether the number of said control pulse signals is proper, the number of said control pulse signals.

* * * * *